United States Patent
Shimizu et al.

(10) Patent No.: US 10,391,539 B2
(45) Date of Patent: Aug. 27, 2019

(54) BLANKING DIE APPARATUS

(71) Applicant: MITSUI HIGH-TEC, INC., Kitakyushu-shi, Fukuoka (JP)

(72) Inventors: Takahiro Shimizu, Fukuoka (JP); Hironosuke Taniishi, Fukuoka (JP)

(73) Assignee: MITSUI HIGH-TEC, INC., Fukuoka (JP)

( * ) Notice: Subject to any disclaimer, the term of this patent is extended or adjusted under 35 U.S.C. 154(b) by 246 days.

(21) Appl. No.: 15/375,332

(22) Filed: Dec. 12, 2016

(65) Prior Publication Data

US 2017/0087619 A1   Mar. 30, 2017

Related U.S. Application Data

(62) Division of application No. 14/533,410, filed on Nov. 5, 2014, now Pat. No. 9,590,478.

(30) Foreign Application Priority Data

Nov. 7, 2013 (JP) .................... 2013-231259
Oct. 2, 2014 (JP) .................... 2014-204095

(51) Int. Cl.
  *B23P 19/00* (2006.01)
  *B21D 28/14* (2006.01)
  *H02K 15/02* (2006.01)

(52) U.S. Cl.
  CPC ........... *B21D 28/14* (2013.01); *H02K 15/022* (2013.01); *Y10T 29/49012* (2015.01); *Y10T 29/53161* (2015.01); *Y10T 83/6484* (2015.04)

(58) Field of Classification Search
  CPC .............. H02K 15/02; Y10T 29/49009; Y10T 29/49078; Y10T 29/49012; Y10T 29/53143; Y10T 29/5317

(Continued)

(56) References Cited

U.S. PATENT DOCUMENTS

| 4,738,020 A | 4/1988 | Neuerschwander |
| 6,195,875 B1 * | 3/2001 | Neuenschwander .. B21D 28/02 29/598 |

(Continued)

FOREIGN PATENT DOCUMENTS

| CN | 101789031 | 7/2010 |
| JP | 01-162529 | 6/1989 |

(Continued)

OTHER PUBLICATIONS

Office Action issued in Japan Counterpart Patent Appl. No. 2014-204095, dated Jul. 4, 2017, along with an English translation thereof.

(Continued)

*Primary Examiner* — Thiem D Phan
(74) *Attorney, Agent, or Firm* — Greenblum & Bernstein, P.L.C.

(57) ABSTRACT

A blanking die apparatus includes multiple machining stations having respective cutting tools operated simultaneously to perform predetermined blanking operations on a belt-shaped workpiece fed progressively in a longitudinal direction and finally to perform a contour blanking operation on the workpiece, thereby forming core pieces used for manufacturing a laminated iron core, and an auxiliary cutting tool that forms a disposal hole by partly blanking a scrap forming area of the workpiece simultaneously with the operations of the cutting tools of the machining stations.

9 Claims, 5 Drawing Sheets

(58) Field of Classification Search
USPC ... 29/598, 564.2, 564.6, 596, 609, 714, 736, 29/73; 156/256, 378, 510
See application file for complete search history.

(56) References Cited

U.S. PATENT DOCUMENTS

| | | |
|---|---|---|
| 6,237,214 B1 | 5/2001 | Neuenschwander |
| 8,035,273 B2 * | 10/2011 | Ionel ................ H02K 1/22 310/156.08 |
| 2014/0231003 A1 | 8/2014 | Oba |

FOREIGN PATENT DOCUMENTS

| | | |
|---|---|---|
| JP | 01-190235 | 7/1989 |
| JP | 05-081337 | 11/1993 |
| JP | 5-328676 | 12/1993 |
| JP | 2001-162336 | 6/2001 |
| JP | 2007-181297 | 7/2007 |

OTHER PUBLICATIONS

Office Action issued in CHINA Counterpart Patent Appl. No. 201410643427.3, dated Feb. 15, 2016, along with an English translation thereof.

\* cited by examiner

BLANKING DIE APPARATUS

CROSS REFERENCE TO RELATED APPLICATIONS

This application is a divisional application of the U.S. application Ser. No. 14/533,410 filed on Nov. 5, 2014, which was based upon and claims the benefit of priorities of Japanese Patent Applications No. 2013-231259 filed on Nov. 7, 2013 and No. 2014-204095 filed on Oct. 2, 2014, the contents of which are incorporated herein by reference in its entirety.

BACKGROUND OF THE INVENTION

1. Field of the Invention

The present invention relates to a laminated iron core manufacturing method and a blanking die apparatus.

2. Description of the Related Art

Figure 4:
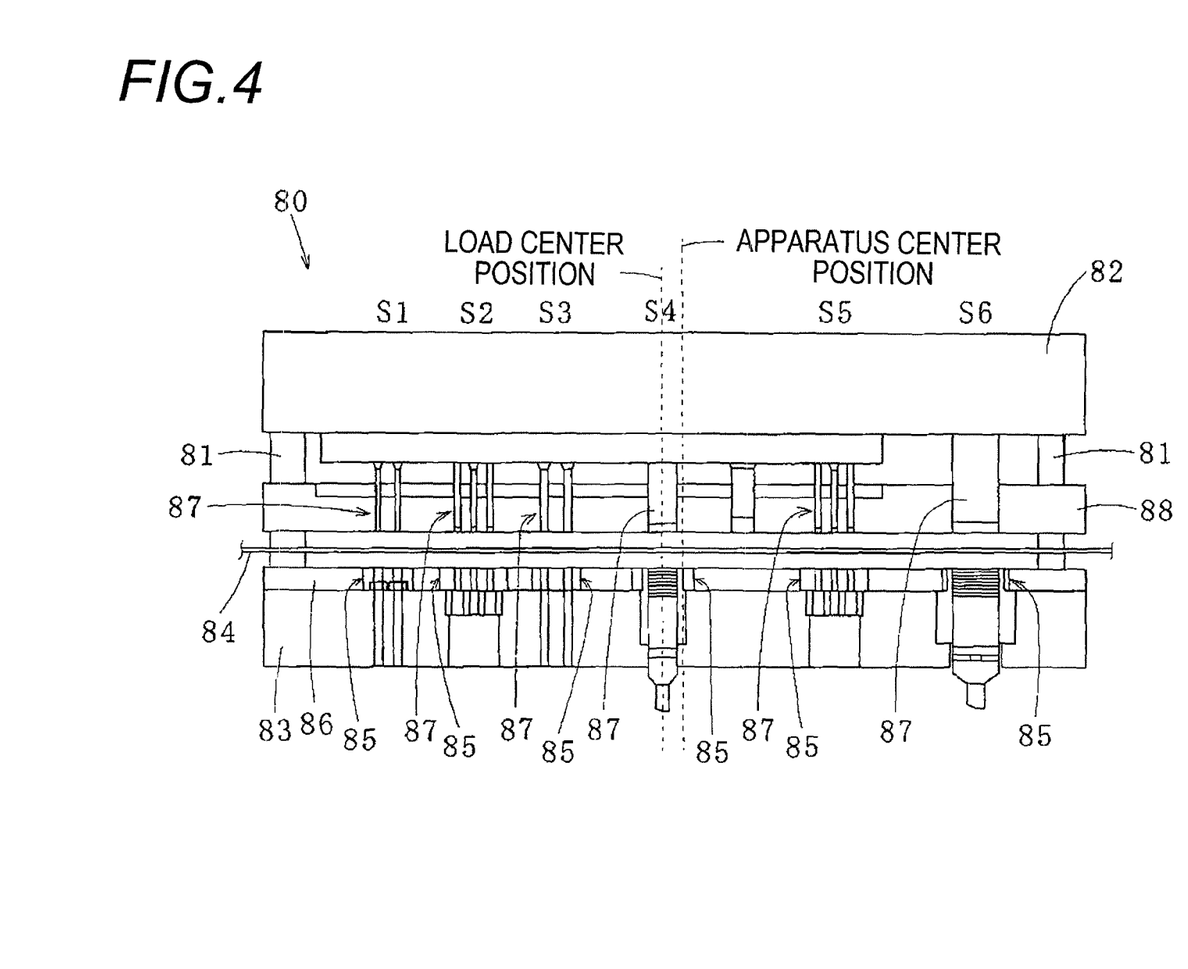
FIG. 4 is an explanatory view of a blanking die apparatus to which a conventional laminated iron core manufacturing method is applied.

Generally, a blanking die apparatus 80, as shown in FIG. 4, includes an upper die tool 82 and a lower die tool 83 connected to each other by multiple guide posts 81 and also has multiple machining stations S1 to S6 (the number of machining stations is arbitrary) respectively for blanking a belt-shaped workpiece 84 (for example, an electromagnetic steel plate) progressively. Each of the machining stations S1 to S6 has a die 85 fixed to the lower die tool 83 and a punch 87, paired with the die 85, fixed to the upper die tool 82, while the punch 87 paired with the die 85 constitutes a cutting tool. The respective machining stations S1 to S6 also have a stripper 88 hanging down from the upper die tool 82 for pressing and holding the workpiece 84 in blanking process. Here, in FIG. 4, the dies 85 equipped in the respective machining stations S1 to S6 are held by a die holder 86 and are fixed to the lower die tool 83, while the strippers 88 equipped in the respective machining stations S1 to S6 hang down from the upper die tool 82.

The workpiece 84 progressively fed to the blanking die apparatus 80 is subjected to blanking in the machining stations S1 to S5 sequentially, is subjected to contour blanking in the final machining station S6 (blanking station), and core pieces blanked in the machining station S6 are crimped and laminated, thereby manufacturing a laminated iron core.

The blanking die apparatus in the related art, however, has a trouble caused by an eccentric load applied in blanking. For example, when the upper die tool is slightly inclined relative to the lower die tool due to the eccentric load, a clearance set between the paired punch and die is varied to cause the punch and die to break, thereby incurring the shortened life of the cutting tool.

Thus, there is set a blanking layout (a discretely arranged state of the machining stations) in which the respective blanking loads of the machining stations for performing their specific blanking processes are previously calculated in order to prevent the blanking loads from being biased forward (on the upstream side in the workpiece progressive feeding direction) or backward (on the downstream side in the progressive feeding direction) over the whole length of the blanking die apparatus. Also, it is desired that the center position of the blanking load (which is hereinafter called the load center position) applied to the whole of the blanking die apparatus coincides with the center position of the whole length of the blanking die apparatus (which is hereinafter called the apparatus center position). Thus, even when perfect coincidence is difficult, the load center position and apparatus center position are normally designed such that they near each other as much as possible.

Here, when the core pieces of a small-diameter laminated iron core to be applied to a small-sized motor for use in a household appliance and the like are blanked from a workpiece using a blanking die apparatus, especially, when the core pieces of laminated iron cores respectively constituting a rotor and a stator are blanked sequentially using a single blanking die apparatus, it is easy to provide a blanking layout in which the load center position and apparatus center position approach each other relatively. However, for example, in a blanking die apparatus which blanks only core pieces for forming a laminated iron core constituting a rotor or a stator, the total of the blanking loads of the machining stations situated nearer to the import side of the workpiece than the apparatus center position for performing the former processes for forming the core pieces is larger than the total of the blanking loads of the machining stations situated nearer to the export side of the workpiece than the apparatus center position for performing the latter processes for forming the core pieces, thereby increasing a gap between the load center position and apparatus center position to incur a load distribution in which an eccentric load is easy to occur.

Figure 5:
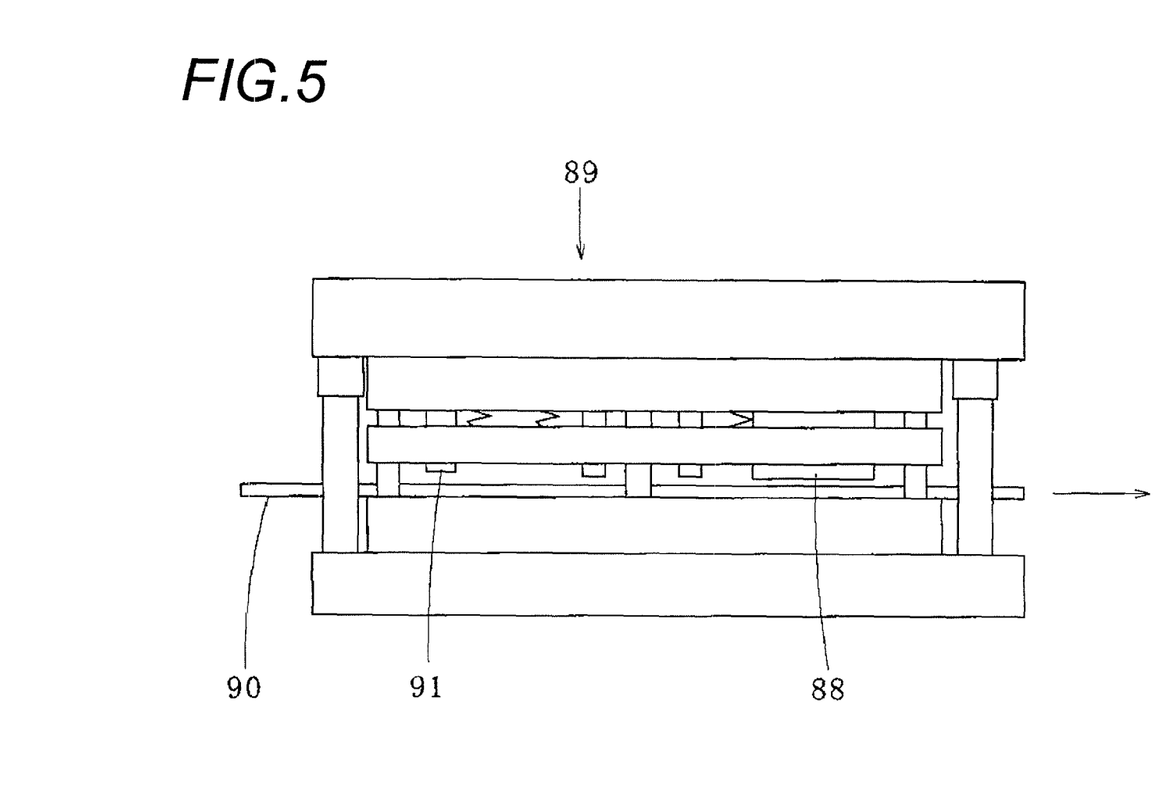
FIG. 5 is an explanatory view of a conventional blanking die apparatus for preventing the generation of an eccentric load.

To solve such eccentric load applied to the blanking die apparatus, for example, in JP-A-2001-162336, as shown in FIG. 5, there is disclosed a technology that, with respect to an eccentric load generated by a bending punch 88 used in a bending process serving as the final process of the machining operations, an inclination preventive punch 91 is provided on the entrance side of a workpiece 90 in a blanking die apparatus 89, and the bending punch 88 and inclination preventive punch 91 are operated simultaneously to thereby cancel the eccentric load.

SUMMARY OF THE INVENTION

JP-A-2001-162336 discloses only the technology for operating the bending punch 88 and inclination preventive punch 91 simultaneously to cancel the eccentric load, but it does not disclose specifically how to operate the inclination preventive punch 91 with respect to the workpiece 90 for cancellation of the eccentric load.

Also, in JP-A-2001-162336, although it is clear that the generation of the eccentric load is caused by the operation of the bending punch 88, for example, as in a blanking die apparatus for blanking the core pieces of a large diameter laminated iron core, when an eccentric load is caused to occur in the blanking die apparatus as the result of the simultaneous operations of the cutting tools of all machining stations, that is, when the occurrence of the eccentric load is not specified as the operation of any one of cutting tools, it is difficult to determine the time for operating the inclination preventive punch for cancellation of the eccentric load and also the intensity and place of a load to be generated by the inclination preventive punch.

Further, in a blanking die apparatus for forming the core pieces of a large diameter laminated iron core for use in an electric vehicle, a hybrid vehicle and the like developed recently, in some cases, the whole length of one set of blanking die apparatus exceeds 2 meters. That is, as a precisely-blanking die apparatus, there has been developed an apparatus of such large size as never been so far. In such large-sized precisiely-blanking die apparatus, there is remarkable the influence of a residual eccentric load caused by a residual gap between the load center position and apparatus center position, which has been no problem in a conventional design standard where the load center position and apparatus center position are made to approach each other as much as possible. Such remarkable influence shortens the lives of the cutting tools and also even the lives of the base of a press and a ram belonging to the blanking die apparatus. This increases the maintenance frequency of the blanking die apparatus to thereby cause the lowered productivity and also increases the number of replacement parts in maintenance to thereby incur the increased cost.

The present invention aims at solving the above problems, for example. Thus, it is one non-limited object of the present invention to provide a laminated iron core manufacturing method and a blanking die apparatus which can reduce or eliminate an eccentric load and can reduce the maintenance frequency and the number of replacement parts.

A first aspect of the present invention provides a laminated iron core manufacturing method in a blanking die apparatus having multiple machining stations, the laminated iron core manufacturing method including: feeding a belt-shaped workpiece progressively in a longitudinal direction in the blanking die apparatus; operating cutting tools provided in the respective machining stations simultaneously to perform predetermined blanking operations on the progressively fed workpiece and finally perform a contour blanking operation on the workpiece so as to form core pieces; and laminating the core pieces within or outside the blanking die apparatus to thereby manufacture a laminated iron core, wherein an auxiliary cutting tool is operated to form a disposal hole by partly blanking a scrap forming area of the workpiece simultaneously with the operations of the cutting tools of the multiple machining stations, to thereby secure a load balance of the blanking die apparatus in the feeding direction.

In this way, the load center position of the total blanking load applied to the blanking die apparatus approaches or coincides with the center position of the blanking die apparatus, thereby reducing or eliminating an eccentric load generated in the blanking die apparatus.

The laminated iron core manufacturing method according to the first aspect of the present invention may be configured so that a plurality of disposal holes are formed with a clearance between them.

The laminated iron core manufacturing method according to the first aspect of the present invention may be configured so that the disposal hole is formed by a plurality of auxiliary cutting tools in multiple stages.

The laminated iron core manufacturing method according to the first aspect of the present invention may be configured so that the plurality of disposal holes are formed at positions to have line symmetry with respect to a center line bisecting a width direction of the workpiece.

The laminated iron core manufacturing method according to the first aspect of the present invention may be configured so that the disposal holes are formed in a closer side position to an outer side than to a center of the scrap forming area in the width direction of the workpiece.

The laminated iron core manufacturing method according to the first aspect of the present invention may be configured so that the disposal hole is formed in a stage just before the contour blanking operation in a case where a total blanking load is smaller on a downstream side than on an upstream side with reference to a center position of the blanking die apparatus.

A second aspect of the present invention provides a blanking die apparatus including: multiple machining stations having respective cutting tools operated simultaneously to perform predetermined blanking operations on a belt-shaped workpiece fed progressively in a longitudinal direction and finally to perform a contour blanking operation on the workpiece, thereby forming core pieces used for manufacturing a laminated iron core; and an auxiliary cutting tool that forms a disposal hole by partly blanking a scrap forming area of the workpiece simultaneously with the operations of the cutting tools of the machining stations, thereby securing a feeding-direction load balance of the blanking die apparatus.

In this way, the load center position of the total blanking load nears or coincides with the center position of the blanking die apparatus, thereby reducing or eliminating an eccentric load generated in the blanking die apparatus.

In a laminated iron core manufacturing method according to the first aspect of the present invention and a blanking die apparatus according to the second aspect of the present invention, the machining areas where the blanking operations are performed on the workpiece in the respective machining stations and the scrap forming area to be set in the workpiece are not superposed on each other. Therefore, the load center position of the total core piece forming load provided by adding together the blanking loads respectively applied to the cutting tools of the machining stations in blanking and the load center position of the total disposal hole forming load provided by adding together the blanking loads applied to the auxiliary cutting tools in the disposal hole blanking operations do not coincide with each other. Here, since the machining stations within the blanking die apparatus are disposed in their previously set positions, the load center position of the blanking loads respectively applied to the cutting tools of the machining stations in blanking is fixed within the blanking die apparatus and thus the load center position of the total core piece forming load is also fixed within the blanking die apparatus. On the other hand, since the number and position of the disposal holes can be determined arbitrarily so long as they exist within the scrap forming area, the number and place of auxiliary cutting tools to be disposed in the blanking die apparatus can also be determined arbitrarily and thus the load center position of the total disposal hole forming load can be set at a desired position within the blanking die apparatus.

When the auxiliary cutting tools are operated simultaneously with the operations of the cutting tools of the machining stations, to the blanking die apparatus, there is applied the total blanking load which is the sum of the total core piece forming load and total disposal hole forming load, whereby the load center position of the total blanking load is caused to move with the movement of the load center position of the total disposal hole forming load. Thus, by adjusting the load center position of the total disposal hole forming load, that is, by adjusting the number and position of disposal holes to be formed within the scrap forming area respectively, the load center position of the total blanking load can be made to near or coincide with the center position of the blanking die apparatus. This can realize the further reduction or elimination of the eccentric load generated in the blanking die apparatus, thereby reducing or preventing the inclination of the blanking die apparatus.

Consequently, variations in the clearances respectively set between the punches and dies to be paired can be reduced or prevented, thereby reducing or preventing the shortened lives of the cutting tools caused by the breakage of the punches and dies and the shortened lives of devices such as the base of a press and a ram belonging to the blanking die apparatus simultaneously. Thus, since the maintenance burden of the blanking die apparatus can be reduced, the cost can be reduced and the productivity can be enhanced.

In the laminated iron core manufacturing method according to the first aspect of the present invention, in the case that the multiple disposal holes are formed, when the disposal holes are formed with a clearance between them, the total of the outer peripheral lengths of punches for forming the disposal holes is increased and thus the total disposal hole forming load can be increased, which can facilitate the movement of the load center position of the total blanking load.

In the laminated iron core manufacturing method according to the first aspect of the present invention, when the disposal holes are formed at positions having line symmetry with respect to a center line bisecting the width direction of the workpiece, the load balance of the total blanking load can be easily maintained with respect to the center line, thereby being able to prevent the torsion of the workpiece in blanking.

In the laminated iron core manufacturing method according to the first aspect of the present invention, when the disposal holes are formed in the width-direction outside portion of the scrap forming area, the movement of the load center position of the total blanking load due to the total disposal hole forming load can be carried out efficiently when compared with disposal holes formed on the width-direction center side of the scrap forming area by the same blanking loads.

In the laminated iron core manufacturing method according to the first aspect of the present invention, in the case that, the total blanking load is smaller on the downstream side that on the upstream side with reference to the center position of the blanking die apparatus, when the disposal holes are formed in the stage just before contour blanking, the load center position of the total disposal hole forming load can be set downstream of the center position of the blanking die apparatus, whereby the load center position of the total blanking load is easily allowed to near or coincide with the center position of the blanking die apparatus.

DETAILED DESCRIPTION OF THE EXEMPLARY EMBODIMENTS

Next, description is given of an embodiment of the present invention with reference to the accompanying drawings for understanding of the present invention.

Figure 1:
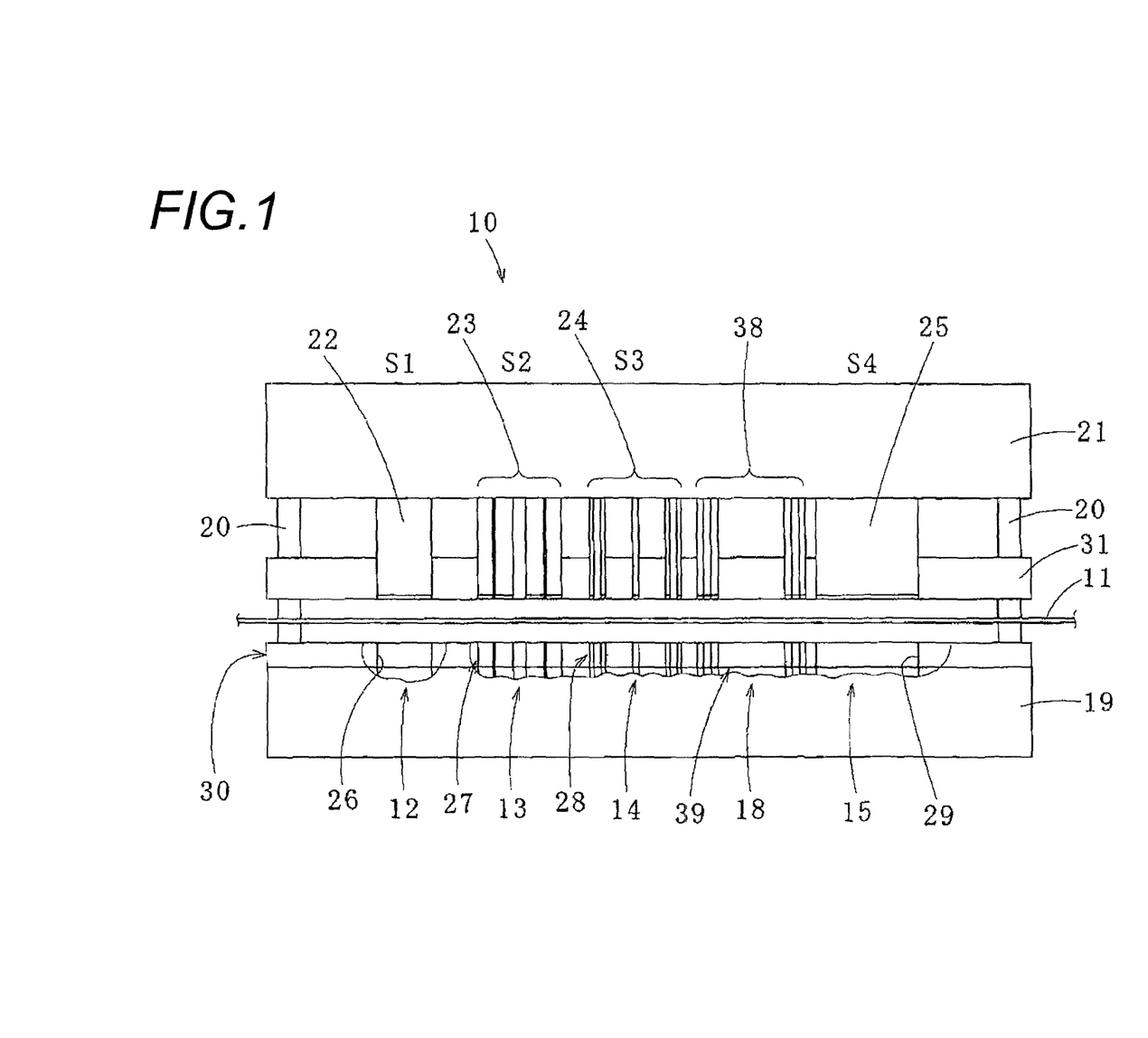
FIG. 1 is an explanatory view of a blanking die apparatus according to an embodiment of the present invention.

As shown in FIG. 1, a blanking die apparatus 10 according to an embodiment of the present invention is, for example, a blanking die apparatus for manufacturing a stator laminated iron core, in which a belt-shaped workpiece 11 (electromagnetic steel plate) fed progressively in the longitudinal direction is subjected to specific blanking operations using cutting tools 12 to 15 arranged in multiple machining stations S1 to S4 and is then subjected to contour blanking to thereby form core pieces 16 (see FIG. 2), and the core pieces 16 are next crimped and laminated to thereby form a laminated iron core. The blanking die apparatus 10 further includes auxiliary cutting tools 18 which, simultaneously with the operations of the cutting tools 12 to 15 of the machining stations S1 to S4, are used to form disposal holes 17 (see FIG. 2) by partly blanking the scrap forming area of the workpiece 11 just before contour blanking. The specific description of the blanking die apparatus 10 is given below.

The blanking die apparatus 10 includes a lower die tool 19 and an upper die tool 21 disposed above the lower die tool 19 and liftably connected thereto through multiple guide posts 20. The workpiece 11 is progressively fed along the longitudinal direction through a clearance between the upper and lower die tools 21 and 19 according to the arrangement positions of the machining stations S1 to S4. The cutting tools 12 to 15 of the machining stations S1 to S4 are respectively constituted of punches 22 to 25 and dies 26 to 29 to be paired with the punches 22 to 25, while the punches 22 to 25 are fixed to the upper die tool 21 and the dies 26 to 29 are held by a die holder 30 disposed on the upper portion of the lower die tool 19. The blanking die apparatus 10 further includes a stripper 31 hung down from the upper die tool 21 through a hanging device (not shown).

Figure 2:
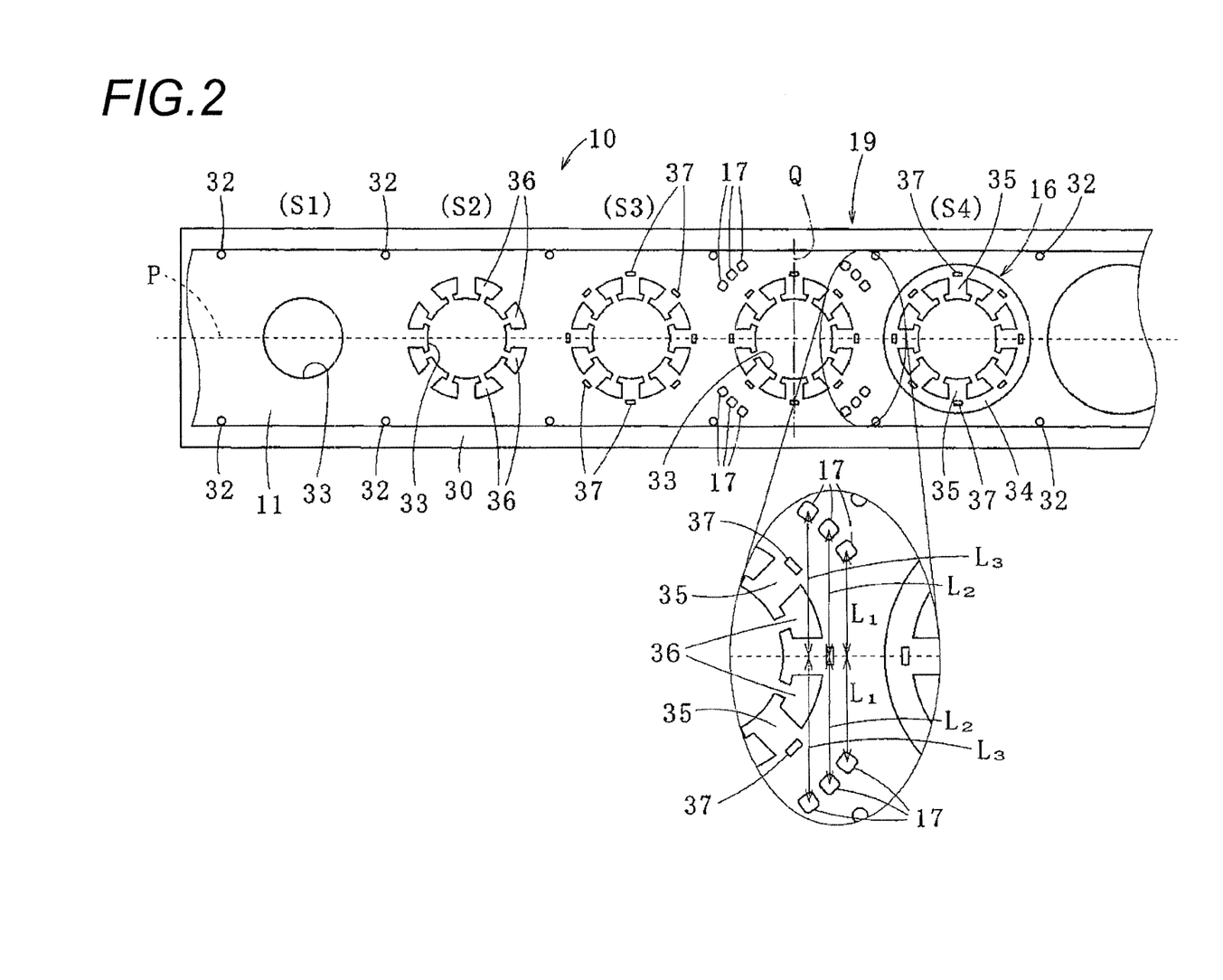
FIG. 2 is an explanatory view of a process for forming core pieces from a workpiece using the blanking die apparatus.

As shown in FIG. 2, in the machining station S1, using the punch 22 the center position of which is matched on to a center line P bisecting the width direction (direction perpendicular to the longitudinal direction) of the workpiece 11 having pilot holes 32 previously formed at given pitches in the two side portions thereof, core pieces (not shown) used to form a rotor laminated iron core constituting a rotor are subjected to contour blanking. In the machining station S2, using the punch 23, on the outer peripheral side of a blanked hole 33 formed after rotor blanking, there are punched multiple slots 36 used to form the inner shapes of the yoke piece sections 34 of the core pieces 16 and multiple magnetic pole piece sections 35. In the machining station S3, using the punch 24, in the yoke piece sections 34 forming areas, there are punched multiple crimping portions 37 to which the yoke piece sections 34 are crimped and connected. In the machining station S4, using the punch 25, the outside sections of the multiple crimping portions 37 are subjected to contour blanking to form the core pieces 16, and the multiple core pieces 16 blanked below the die 29 are crimped and laminated to form a laminated iron core.

A punch 38 for forming the disposal holes 17 and the auxiliary cutting tool 18 including a die 39 to be paired with the punch 38 are interposed between the cutting tool 14 for forming the crimping portions 37 in the workpiece 11 and cutting tool 15 for contour blanking the core pieces 16 (that is, the punch 38 is fixed to the upper die tool 21 such that it intervenes between the punches 24 and 25; and, the die 39 is held by the die holder 30 such that it intervenes between the dies 28 and 29). Here, the punch 38 and die 39 are positioned in the following manner. For example, where a straight line passing through the center of the blanked hole 33 and perpendicular to the center line P of the workpiece 11 is expressed as a center line Q, when the scrap forming area existing outside the blanked holes 33 is divided into four by the center lines P and Q, the positions of the disposal holes 17 formed in the respective divided portions can be distant from the center lines P and Q as much as possible and also they respectively have line symmetry with respect to the center lines P and Q and have point symmetry with respect to the intersection of the center lines P and Q (center of the blanked hole 33).

With this structure, when the upper die tool 21 is lowered toward the lower die tool 19 while being guided by the guide posts 20, the punches 22 to 25 and 38 can be operated simultaneously while the workpiece 11 is contacted with and pressure held by the dies 26 to 29 and 39 using the stripper 30. Thus, while performing specific blanking operations and contour blanking operations on the workpiece 11 in the machining stations S1 to S4, the disposal holes 17 can be formed by partly blanking the width-direction outside portion of the scrap forming area using the auxiliary cutting tools 18, thereby securing the load balance of the blanking die apparatus 10 in the feed direction.

Next, description is given of a laminated iron core manufacturing method according to an embodiment of the present invention.

Since the machining areas for blanking the workpiece 11 in the respective machining stations S1 to S4 are not superposed on the scrap forming area to be set in the workpiece 11, the load center position of the total core piece forming load obtained by adding together blanking loads respectively applied to the cutting tools 12 to 15 of the machining stations S1 to S4 in blanking does not coincide with the load center position of the total disposal hole forming load obtained by adding together blanking loads respectively applied to the auxiliary cutting tools 18 while forming the disposal holes 17 by blanking.

Also, since the machining stations S1 to S4 within the blanking die apparatus 10 are located at their previously set positions, the load center positions of the blanking loads respectively applied to the cutting tools 12 to 15 of the machining stations S1 to S4 in blanking are respectively fixed to the positions (center positions) of the cutting tools 12 to 15 within the blanking die apparatus 10, with the result that the load center position of the total core piece forming load is fixed to a specific position within the blanking die apparatus 10. On the other hand, since the number and position of the disposal holes 17 can be determined arbitrarily so long as they exist within the scrap forming area, the number and position of the auxiliary cutting tools 18 to be disposed in the blanking die apparatus 10 can also be determined arbitrarily, and the load center position of the total disposal hole forming load can be determined univocally according to the position of the auxiliary cutting tool 18 within the blanking die apparatus 10.

Here, when the auxiliary cutting tools 18 are operated simultaneously with the operations of the cutting tools 12 to 15 of the machining stations S1 to S4, the total blanking load constituted of the sum of the total core piece forming load and total disposal hole forming load is applied to the blanking die apparatus 10, and thus the load center position of the total blanking load is determined by the load center position of the total disposal hole load. Therefore, by adjusting the load center position of the total disposal load, that is, by adjusting such position of the auxiliary cutting tool 18 in the blanking die apparatus 10 as can be determined by the number and position of disposal holes 17 to be formed within the scrap forming area, the load center position of the total blanking load can be made to near or coincide with the center position of the blanking die apparatus 10. This can further reduce or lose an eccentric load generated in the blanking die apparatus 10, thereby controlling or preventing the inclination of the blanking die apparatus 10. As a result, variations in clearances respectively set between the punches 22 to 25 and dies 26 to 29 can be controlled or prevented, thereby controlling or preventing simultaneously the shortened lives of the cutting tools 12 to 15 caused by the damage of the punches 22 to 25 and dies 26 to 29 and the shortened lives of devices such as the base of a press and a ram respectively belonging to the blanking die apparatus 10. This can reduce the burden of the maintenance of the blanking die apparatus 10, whereby its cost can be reduced and its productivity can be enhanced.

The disposal hole 17 may have an arbitrary shape (peripheral shape) such as a circular shape, an oval shape and a star shape.

Here, the blanking load is proportional to the product of the outer peripheral length of the punch 38 (coincident with the inner peripheral length of the disposal hole 17) and the thickness (shear resistance) of the workpiece 11. Therefore, for example, in the case that the diameter of a circle circumscribing the disposal hole 17 is the same, as the peripheral length of the disposal hole 17 like the star shape increases, the blanking load increases and thus the total disposal forming load increases, whereby the number of disposal holes 17 can be reduced. Also, when forming multiple disposal holes 17, they may be formed with a clearance between them. This can increase the total outer peripheral length of the punch 38 for forming the disposal holes 17 and thus can increase the total disposal hole forming load, thereby being able to move the load center position of the total blanking load easily.

Since the core pieces constituting the stator laminated iron core, generally, have line symmetry with respect to the center line P, the load center positions of the blanking loads applied respectively to the cutting tools 12 to 15 exist on the center line P and the load center position of the total core piece forming load also exists on the center line P. Thus, since the disposal holes 17 are formed at positions to have line symmetry with respect to the center line P (for example, as shown in FIG. 2, positions respectively having equal distances $L_1$, $L_2$ and $L_3$ from the center line P), the workpiece 11 can be prevented from being twisted in blanking. Here, as shown in FIG. 2, when the disposal holes 17 are formed in the width-direction outside portion of the scrap forming area, in comparison with disposal holes formed in the width-direction center side portion of the scrap forming area with the same blanking load, the action of the total disposal hole forming load at the load center position of the total disposal hole forming load existing on the center line P is large. This permits the efficient movement of the load center position of the total blanking load. And, by adding further a condition that the disposal holes 17 have the same shape, when the blanking operations in the machining stations S1 to S4 are executed simultaneously with the disposal holes 17 blanking operations by the auxiliary cutting tools 18, the balance of the total blanking load on width-direction both sides of the workpiece 11 with respect to the center line P can be maintained positively and, even when the disposal holes 17 are formed, the workpiece 11 can be prevented from being twisted.

Further, when, the total of blanking loads in the machining stations on the downstream side is smaller than those on the upstream side with reference to the center position of the blanking die apparatus 10 (apparatus center position), the load center position of the total core piece forming load existing on the center line P exists upstream of the apparatus center position. Thus, as shown in FIG. 2, when the disposal holes 17 are formed in the stage just before contour blanking, that is, at positions on the downstream side as distant as possible from the apparatus center position of the scrap forming area, in comparison with disposal holes formed at positions on the downstream side not far from the apparatus center position of the scrap forming area with the same blanking load, the action of the total disposal hole forming load at the load center position of the total disposal hole forming load existing downstream of the apparatus center position on the center line P can be made large, thereby facilitating the movement of the load center position of the total blanking load. And, since the action of the total disposal hole forming load at the load center position of the total disposal hole forming load is large, for example, even when the disposal hole 17 is simplified in shape, the number of disposal holes 17 is reduced and the disposal hole 17 blanking load is reduced, the load center position of the total blanking load can be made to near or coincide with the apparatus center position. This can realize the reduced production cost of the auxiliary cutting tools 18.

Figure 3:
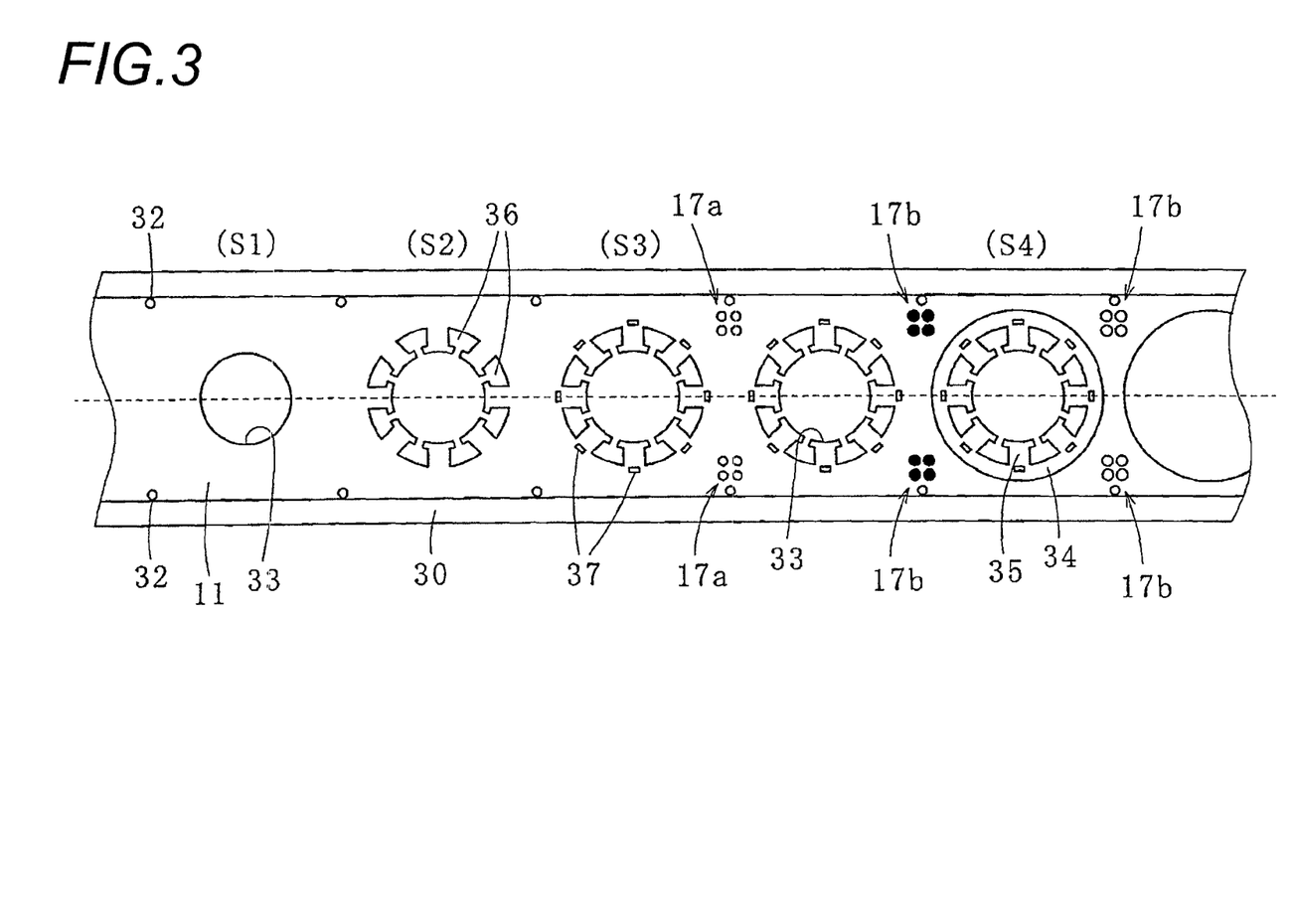
FIG. 3 is an explanatory view of a laminated iron core manufacturing method according to another embodiment of the present invention.

Description is given of a laminated iron core manufacturing method according to another embodiment of the present invention with reference to FIG. 3. In the laminated iron core manufacturing method, the same disposal hole is formed in multiple blanking steps (stages), i.e., with a plurality of auxiliary cutting tools. That is, the disposal holes may be formed in separate multiple steps. For example, it is possible that a smaller diameter disposal hole 17a is first formed by blanking the width-direction outside portion of the scrap forming area, and then a larger diameter disposal hole 17b is formed in the subsequent step by containing therein the smaller diameter disposal hole 17a which is previously formed. In this way, disposal holes in different diameters are formed at the same location in separate multiple steps even in the case that the scrap forming area is small and disposal holes cannot be formed at a plurality of locations, so that the total disposal hole forming load can be made large, thereby making the load center position of the total blanking load to near or coincide with the apparatus center position.

Although the present invention has been described heretofore with reference to the embodiments thereof, the present invention is not limited to the structure described in the above embodiments but contains other embodiments and modifications falling within the items described in the scope of the present disclosure.

Further, when composing elements contained in the above embodiment, other embodiments and modifications are combined with each other, the combined composing elements also fall under the present invention.

For example, in the embodiment, the auxiliary cutting tools are added to a non-working station existing just before the machining station for performing a contour blanking operation on the core pieces; however, some of core piece forming methods have not such non-working station just before the machining station for performing a contour blanking operation on the core pieces. In this case, one or multiple auxiliary cutting tools for forming disposal holes is or are added to one or multiple machining stations arbitrarily selected from machining stations which exist not only downstream of the center position of the blanking die apparatus (apparatus center position) but also before the machining station for subjecting the core pieces to contour blanking.

Also, when, with reference to the center position of the blanking die apparatus, the total blanking load in the downstream side machining stations and the total blanking load in the upstream side machining stations do not balance with respect to each other, the disposal holes are formed on the side the total blanking load of which is smaller, thereby causing the load center position of the total blanking load to near or coincide with the apparatus center position. However, in order to cause the load center position of the total blanking load to further near or coincide with the apparatus center position more easily, disposal holes can be also formed additionally at further positions of the scrap forming area on the upstream and downstream sides with reference to the apparatus center position.

Further, in the embodiment, the core pieces are crimped and laminated within the blanking die apparatus to thereby form the laminated iron core. Alternatively, the core pieces may be adhered and laminated within the blanking die apparatus to thereby form the laminated iron core, or, core pieces formed within the blanking die apparatus may also be delivered to a laminating apparatus disposed outside the blanking die apparatus, where they may be then welded to thereby form the laminated iron core.

In the present invention, the load of the blanking die apparatus may be actually measured by a load cell or the like for each punch. However, it is general and easier to calculate the load from a cutting length assuming that the load is proportional to the length of the cutting line which is a contact line of the punch and the die.

What is claimed is:

1. A blanking die apparatus, comprising:
    multiple machining stations having respective cutting tools operated simultaneously to perform predetermined blanking operations on a belt-shaped workpiece fed progressively in a longitudinal direction and finally to perform a contour blanking operation on the workpiece, thereby forming core pieces used for manufacturing a laminated iron core; and
    an auxiliary cutting tool that forms a disposal hole by partly blanking a scrap forming area of the workpiece simultaneously with the operations of the cutting tools of the machining stations, thereby securing a feeding-direction load balance of the blanking die apparatus.

2. The blanking die apparatus according to claim 1, wherein the auxiliary cutting tool forms a plurality of disposal holes with a clearance between them.

3. The blanking die apparatus according to claim 2, wherein the auxiliary cutting tool forms the plurality of disposal holes at positions to have line symmetry with respect to a center line bisecting a width direction of the workpiece.

4. The blanking die apparatus according to claim 3, wherein the auxiliary cutting tool forms the disposal holes in a closer side position to an outer side than to a center of the scrap forming area in the width direction of the workpiece.

5. The blanking die apparatus according to claim 1, wherein a plurality of auxiliary cutting tools form the disposal hole in multiple stages.

6. The blanking die apparatus according to claim 1, wherein the auxiliary cutting tool forms the disposal hole in a stage just before the contour blanking operation in a case where a total blanking load is smaller on a downstream side than on an upstream side with reference to a center position of the blanking die apparatus.

7. The blanking die apparatus according to claim 1, wherein the auxiliary cutting tool is provided in one or multiple machining stations which exist downstream of a center position of the blanking die apparatus before the machining station for performing the contour blanking operation on the workpiece.

8. The blanking die apparatus according to claim 1, wherein the auxiliary cutting tool is interposed between a crimping cutting tool for forming crimping portions and a contour cutting tool for contour blanking the core pieces.

9. The blanking die apparatus according to claim 1, further comprising:
   a second auxiliary cutting tool that forms a second disposal hole by partly blanking a scrap forming area of the workpiece simultaneously with the operations of the cutting tools of the machining stations, wherein the second auxiliary cutting tool is provided in an arbitrary station among the multiple machining stations.

* * * * *